United States Patent
Akos et al.

(10) Patent No.: US 11,262,458 B2
(45) Date of Patent: Mar. 1, 2022

(54) SMART ANTENNA MODULE FOR GNSS RECEIVERS

(71) Applicant: The Regents of the University of Colorado, Denver, CO (US)

(72) Inventors: Dennis M. Akos, Boulder, CO (US); Nagaraj Channarayapatna Shivaramaiah, Boulder, CO (US); Yafeng Li, Beijing (CN)

(73) Assignee: The Regents of the University of Colorado, a body corporate, Denver, CO (US)

( * ) Notice: Subject to any disclaimer, the term of this patent is extended or adjusted under 35 U.S.C. 154(b) by 377 days.

(21) Appl. No.: 16/375,458

(22) Filed: Apr. 4, 2019

(65) Prior Publication Data

US 2019/0310379 A1    Oct. 10, 2019

Related U.S. Application Data

(60) Provisional application No. 62/652,403, filed on Apr. 4, 2018.

(51) Int. Cl.
*G01S 19/32* (2010.01)
*H01Q 5/50* (2015.01)
*G01S 19/21* (2010.01)

(52) U.S. Cl.
CPC .............. *G01S 19/32* (2013.01); *G01S 19/21* (2013.01); *H01Q 5/50* (2015.01)

(58) Field of Classification Search
CPC ........... G01S 19/21; G01S 19/32; G01S 19/36
See application file for complete search history.

(56) References Cited

U.S. PATENT DOCUMENTS

| 5,339,455 A | 8/1994 | Vogt et al. |
| 5,736,961 A * | 4/1998 | Fenton .................. G01S 19/32 |
| | | 342/352 |

(Continued)

FOREIGN PATENT DOCUMENTS

CN    106330218 B  *  5/2019

OTHER PUBLICATIONS

English Translation of CN 106330218 B (Year: 2021).*

*Primary Examiner* — Bernarr E Gregory
*Assistant Examiner* — Fred H Mull

(57) ABSTRACT

Various embodiments of the present technology generally relate to Global Navigation Satellite Systems (GNSS). More specifically, the embodiments of the present technology relate to a smart antenna module resistant to Radio Frequency Interference (RFI) saturation for dual-frequency GNSS receivers. In some embodiments, a dynamically configured antenna module architecture can be for a dual-band (or multi-frequency) GNSS receiver that can adapt to different RFI conditions by performing corresponding working modes. For example, some embodiments of the smart antenna can measure (e.g., using a power detector) the power of an incoming multi-frequency signal to determine when the multifrequency signal is saturated. Then, using control logic the smart antenna can determine which frequency in the multi-frequency signal is usable and isolate (e.g. using radio frequency components) a frequency that is not saturated. A position estimate can then be generated based on the isolated multi-frequency signal.

20 Claims, 13 Drawing Sheets

(56) References Cited

U.S. PATENT DOCUMENTS

| | | | |
|---|---|---|---|
| 6,639,541 B1* | 10/2003 | Quintana | G01S 19/21 |
| | | | 342/18 |
| 7,155,340 B2 | 12/2006 | Churan | |
| 7,642,910 B2 | 1/2010 | Eskildsen | |
| 8,975,967 B2 | 3/2015 | Ashjaee et al. | |
| 9,453,916 B2 | 9/2016 | Riley et al. | |
| 2004/0146127 A1 | 7/2004 | Kent, III et al. | |
| 2004/0239559 A1 | 12/2004 | King et al. | |
| 2008/0001731 A1 | 1/2008 | Eskildsen | |
| 2013/0142295 A1* | 6/2013 | Badke | G01S 19/21 |
| | | | 375/350 |
| 2014/0184443 A1 | 7/2014 | Riley et al. | |
| 2017/0261615 A1* | 9/2017 | Ying | G01S 19/21 |

* cited by examiner

SMART ANTENNA MODULE FOR GNSS RECEIVERS

CROSS-REFERENCE TO RELATED APPLICATIONS

This application claims priority to U.S. Provisional Patent Application No. 62/652,403 filed Apr. 4, 2018, which is incorporated herein by reference in its entirety for all purposes.

TECHNICAL FIELD

Various embodiments of the present invention generally relate to Global Navigation Satellite Systems (GNSS). More specifically, the embodiments of the present invention relate to a smart antenna module resistant to RFI saturation for dual-frequency (or multi-frequency) GNSS receivers.

BACKGROUND

Global Navigation Satellite System (GNSS), which includes Global Positioning System (GPS), Galileo, GLONASS, Beidou, and other regional systems, provides precise time synchronization and accurate geospatial positioning. GNSS systems typically include multiple satellites that broadcast multi-frequency signals. The signals are picked up by receivers (e.g., in airplanes, automobiles, sea vessels, cell phones, surveying equipment, etc.) that extract desired information from the signals.

With GNSS receivers exposed to greater levels of Radio Frequency Interference (RFI), a potential problem is the saturation of the receiver Integrated Front End (IFE, including antenna in broad sense) by strong RFI received. Although this issue has been recognized, it has not obtained sufficient attention in the GNSS community. However, for receivers that must work near RFI sources, IFE saturation is a fatal problem, because once the IFE saturation occurs, it prevents any meaningful downstream digital signal processing against all forms of GNSS RFI, thereby significantly degrading or most likely disabling the GNSS receiver outputs.

SUMMARY

Various embodiments of the present technology generally relate to Global Navigation Satellite Systems (GNSS). More specifically, the embodiments of the present technology relate to a smart antenna module resistant to RFI saturation for dual-frequency GNSS receivers. In some embodiments, a dynamically configured antenna module architecture can be for a dual-band (or multi-frequency) GNSS receiver that can adapt to different RFI conditions by performing corresponding working modes. For example, some embodiments of the smart antenna can measure (e.g., using a power detector) the power of an incoming multi-frequency signal to determine when the multifrequency signal is saturated. Then, using control logic the smart antenna can determine which frequency in the multi-frequency signal is usable and isolate (e.g. using radio frequency components) a frequency that is not saturated. A position estimate can then be generated based on the isolated multi-frequency signal.

Embodiments of the present invention also include computer-readable storage media containing sets of instructions to cause one or more processors to perform the methods, variations of the methods, and other operations described herein.

While multiple embodiments are disclosed, still other embodiments of the present technology will become apparent to those skilled in the art from the following detailed description, which shows and describes illustrative embodiments of the invention. As will be realized, the technology is capable of modifications in various aspects, all without departing from the scope of the present technology. Accordingly, the drawings and detailed description are to be regarded as illustrative in nature and not restrictive.

BRIEF DESCRIPTION OF THE DRAWINGS

Embodiments of the present technology will be described and explained through the use of the accompanying drawings.

Figure 1:
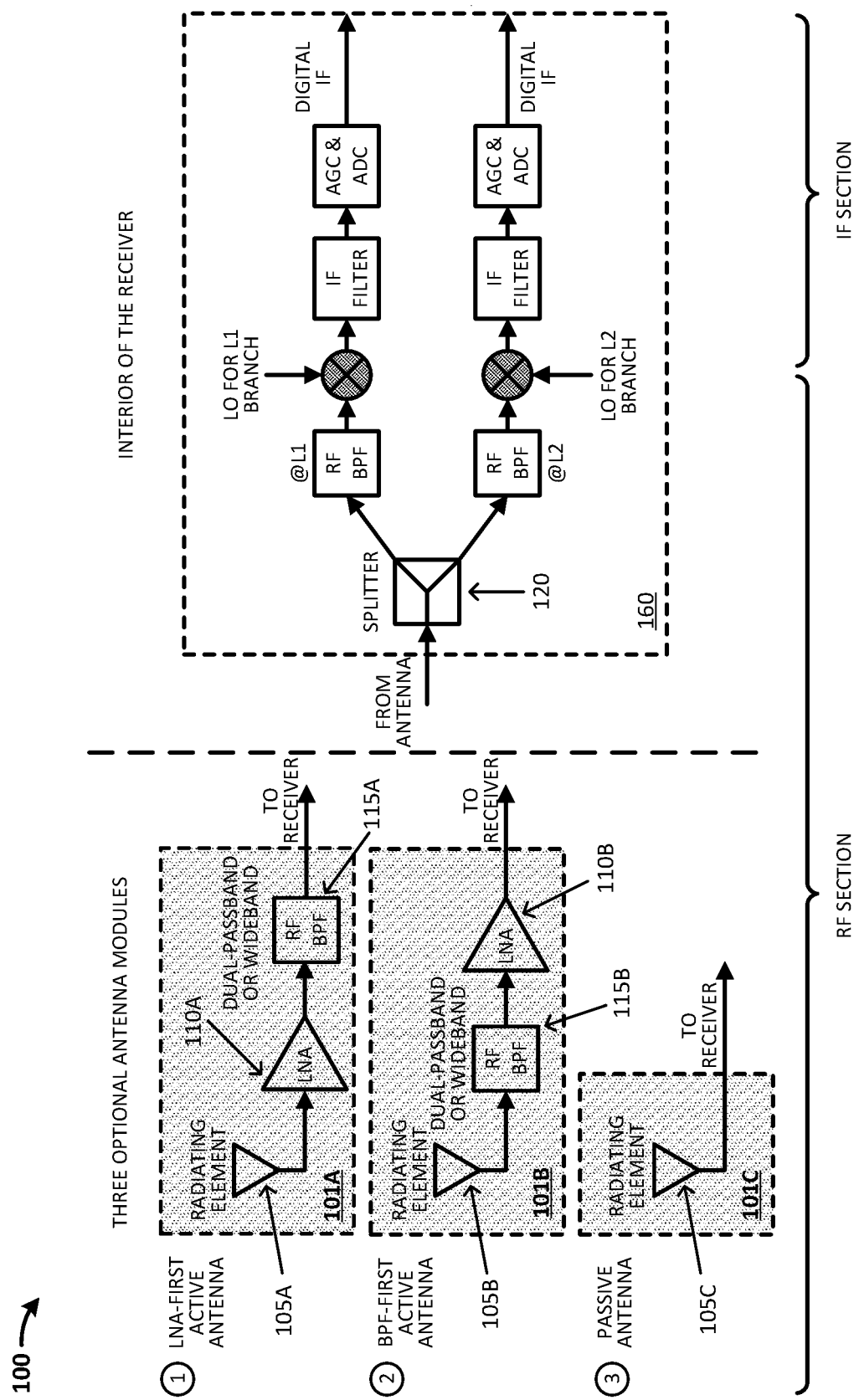
FIG. 1 is a top-level schematic diagram of the RF chain architecture for a typical L1/L2 dual-frequency receiver that may be used in various embodiments of the present technology.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to Global Navigation Satellite Systems (GNSS). More specifically, the embodiments of the present technology relate to a smart antenna module resistant to Radio Frequency Interference (RFI) saturation for dual-frequency GNSS receivers. As the first line of defense against RFI, the antenna plays an important role in the anti-RFI operation of the GNSS receiver. With GNSS receivers exposed to greater levels of RFI, a potential problem is the saturation of the receiver Integrated Front End (IFE, including antenna in broad sense) by strong RFI received.

This problem is further complicated in the case of multi-frequency receivers by the cross-frequency saturation effect. Under this condition, in-band RFI that can induce IFE saturation at only one specific GNSS frequency, if not properly handled, would also impact on reception of other frequencies. To solve this issue, it is preferable to construct an antenna-based solution to detect, identify, and isolate potential RFI to protect the receiver IFE from being saturated. It is found that any configurations with fixed connections between components inside an antenna module cannot provide the optimal noise performance while capable of RFI saturation rejection under all forms of RFI conditions. To achieve an optimal solution, a dynamically configured antenna module architecture for dual-band GNSS receiver can be used in some embodiments that can adapt to different RFI conditions by performing corresponding working modes. The main principle of some embodiments of the antenna module have been verified by experiments with real GPS signals under controlled cross-frequency RFI conditions.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

Introduction

With the presence of more GNSS satellites and signals, the number of multi-GNSS receivers for high-end and professional applications has continued to grow over the past few years. This trend will inevitably continue into mass market in the future. Compared to the commonly used Global Positioning System (GPS)-only receiver, multi-GNSS receivers can significantly improve the accuracy, availability, and integrity of the Positioning, Navigation, and Timing (PNT) information by handling multiple frequencies from multiple constellations. However, this has not eliminated some fundamental challenges to GNSS receivers, especially under adverse working environments. One of the remaining concerns of paramount importance to the GNSS community is the RFI.

The topic of RFI threats is quite hot and new countermeasures are still being proposed in the GNSS community. At the user segment, the general approach to handling RFI is to first detect and characterize the RFI condition, and then take appropriate mitigation strategies. From a fundamental point of view, the effective mitigation of RFI is based on the separable characteristics of useful signals from RFI in time, frequency, space, or other transformed domains, which can be best guaranteed only if the receiver IFE responds linearly to the input combination of signal, noise and RFI. Therefore, the linear dynamic range of the IFE (including the antenna in broad sense) responding to strong RFI sets the upper bound of the RFI mitigation capability of a GNSS receiver regardless of the methods used.

As a weak link, the IFE is susceptible to nonlinear effects such as saturation or desensitization that distort the input waveforms by strong RFI received. The most common forms of unintended RFI capable of IFE saturation originate from legitimate but nearby, high-powered transmitters, especially those of radars. In-band, Out-of-Band (OoB), and near-band RFI can all cause IFE saturation by a wide range of mechanisms. OoB RFI is most likely to saturate the first-stage LNA (e.g. the one within the active antenna) along the RF chain of the IFE, while near- and in-band RFI tends to overload the later stages, especially the Analog-to-Digital Converter (ADC) with insufficient bit resolution. When it comes to multi-frequency receivers, the IFE saturation issue caused by in-band RFI can be further complicated by the cross-frequency effect. Under this condition, in-band RFI that can induce IFE saturation at only one specific GNSS frequency, if not properly handled, would also impact on reception of other frequencies, especially when the common LNA is saturated before the combined input signal is split into separate frequency branches.

None of the existing methods can provide a complete solution to IFE saturation under different RFI conditions including the cross-frequency interference. OoB RFI induced saturation can only be mitigated by IFE stopband filtering. Some existing FE modules, specifically designed for hand-held devices with many other wireless applications co-existing, adopt a bandpass filter located immediately after the antenna radiating element to protect subsequent active stages of the IFE from saturation by OoB RFI. However, for multi-frequency GNSS receivers, this design strategy has limited near-band RFI attenuation and does not address the problem of cross-frequency RFI. Adaptive ADC technique can reduce IFE nonlinear effects induced by in-band RFI with constant envelope, but is not effective for OoB and near-band RFI saturation. The cross-frequency RFI saturation issue has not yet received sufficient attention.

For existing commercial GNSS receivers that do not offer the opportunity for including anti-IFE-saturation techniques inside them, a feasible solution is to combine the antenna design with the prefilter and preamp to construct antenna module resistant to RFI saturation. To this end, two basic classes of traditional antenna module configurations are explored. The difference lies in the location of the first-stage LNA relative to the Bandpass Filter (BPF) within the antenna module. In the LNA-first configuration, the LNA directly follows the radiating element. On the other hand, a BPF is placed between the radiating element and LNA in the BPF-first configuration. Analysis shows that with internal components configured in a fixed manner in the antenna module, there is a conflict between obtaining low Noise Figure (NF) and mitigating higher RFI saturation. Taking this dilemma in traditional antenna design framework as well as the cross-frequency saturation issue in to consideration, an antenna module comprised of dynamically configurable component network may be used in some embodiments of dual-frequency GNSS receivers.

Using RF detectors and switches, this antenna module can detect, identify, and isolate potential RFI to the receiver IFE from being saturated, as well as achieve adaptive balance between the resulting NF and RFI-saturation rejection by implementing different working modes corresponding to specific RFI condition identified. Various embodiments of the smart antenna module can be integrated as a single active antenna or plugged in between a passive antenna and the receiver as an anti-RFI-saturation unit. Both cases can be easily applied to typical mass market and commercial dual-frequency GNSS receivers.

1. Typical GNSS Receiver RF Chain Architecture and Configurations

In many cases the dominant RFI saturation occurs from OoB interference. This section examines the typical GNSS receiver RF chain architecture and states the LNA saturation issue depending on specific RF configurations. The dual-frequency implementation is a common form of multi-frequency GNSS receivers. Here, a L1/L2 dual-frequency is used as example to illustrate the present technology.

The top-level schematic diagram of the RF chain architecture 100 for a typical L1/L2 dual-frequency receiver is shown in FIG. 1. FIG. 1 demonstrates three optional antenna modules that can be used in conjunction with a dual-frequency receiver. The three optional antenna modules include LNA-first active antenna module 101A, BPF-first active antenna module 101B, and passive antenna module 101C. The three optional antenna modules send the received signal into dual-frequency receiver 160. LNA-first active antenna module comprises radiating element 105A, which receives the signal. The signal then passes through LNA 110A and from LNA 110A, passes through radio (RF) frequency bandpass filter (BPF) 115A before entering receiver 160. RF BPF 115A may be a dual-passband or wideband filter, in some situations.

Alternatively, in BPF-first active antenna module 101B, the signal is received by radiating element 105B, before being filtered by RF BPF 115B, and finally amplified by LNA 110B before entering receiver 160. Lastly, passive antenna module 101C receives a signal with radiating element 105C before the signal enters receiver 160.

The GNSS signals in space can be received by active or passive antennas depending on the length of the cable from which the antenna output is fed to the receiver. Inside the receiver, the received signals are first amplified by LNA 110A-110B, and then split into separate L1 and L2 branches by splitter 120. For each frequency branch, the signal is finally converted to digital stream through down-conversion and ADC sampling in receiver 160. One fatal issue with the RF chain is the potential saturation of the illustrated LNAs under severe RFI conditions. Once LNA saturation occurs, it prevents any meaningful downstream digital signal processing against all forms of GNSS RFI, thereby significantly degrading or most likely disabling the GNSS receiver outputs. Since the anti-RFI-saturation solution used in various embodiments of the present technology is antenna based, the focus here is the antenna stage. If passive antenna module 105C is used, its radiating element 105C plus the LNA inside the receiver is equivalent to an active antenna in functionality. For ease of discussion, both active antennas, 101A and 101B, and the passive antenna, 101C, plus the LNA behind it are collectively referred to as antenna module thereafter.

The impact of OoB RFI on the operation of LNA inside an antenna module highly depends on the antenna module type and configuration. The antenna module type is generally defined by its radiating element which conditions the incident signals as a space filter. Patch and helix antennas are the two most commonly used antenna types.

Figure 2A:
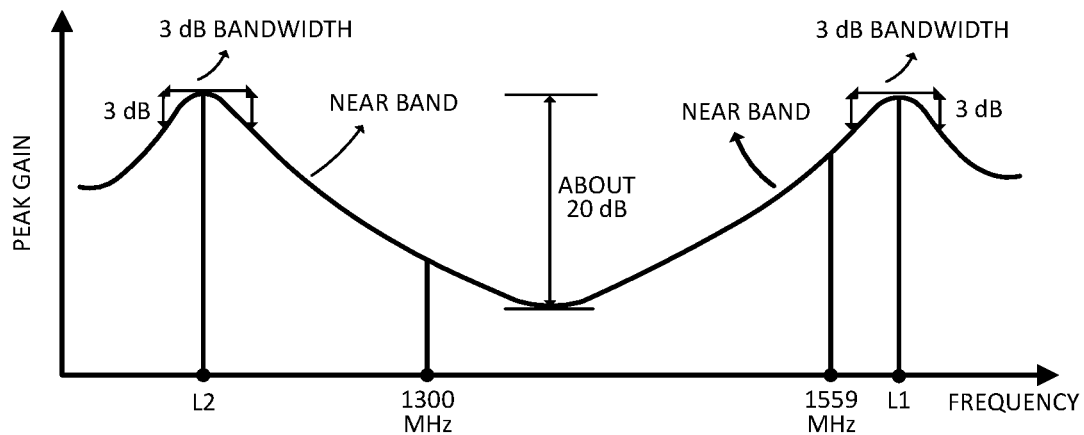
FIGS. 2A-2B are schematic representations of the frequency responses of typical L1/L2 dual-frequency patch and helix radiating elements respectively that may be used in some embodiments of the present technology.
Figure 2B:
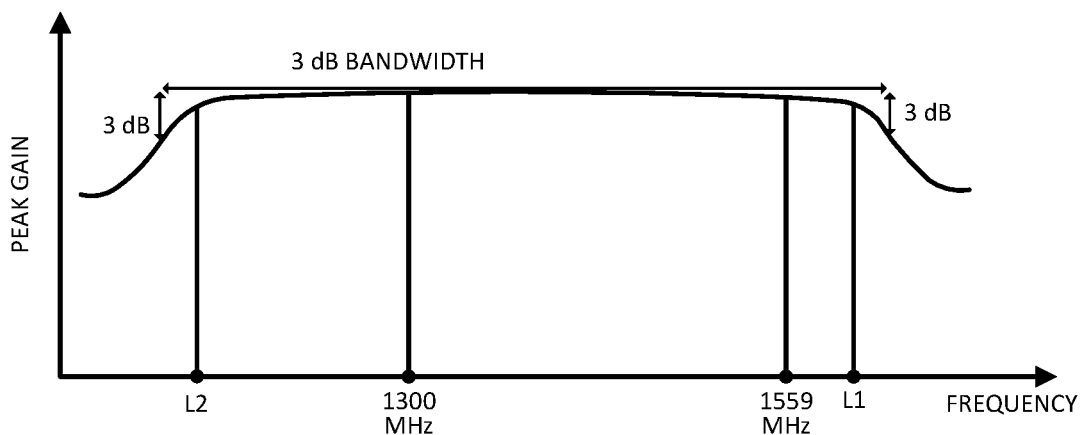

FIGS. 2A-2B demonstrate the frequency responses 200 of typical L1/L2 patch and helix radiating elements. Since the patch radiating element is inherently narrowband, its frequency response is typically tuned to each of the specific operating frequency bands, generating two pass bands at L1 and L2 frequencies accordingly. Therefore, a patch radiating element inherently has certain band limiting to RFI out of GNSS bands. However, if the arrival RFI is strong enough, the radiating element attenuation is not sufficient to protect the LNAs from being saturated, as the maximum OoB rejection of patch radiating element is typically about 20 dB; its attenuation capability of near-band RFI is especially poor due to the wide skirts on both sides of each passband. For dual-frequency helix radiating element, its frequency response curve generally covers not only the two GNSS bands of interest, but also a gap of 259 MHz (1300-1559 MHz) as shown in FIG. 2B. Consequently, the helix radiating element alone cannot provide RFI resistance within this gap, although it is out of any GNSS bands.

Figure 3A:
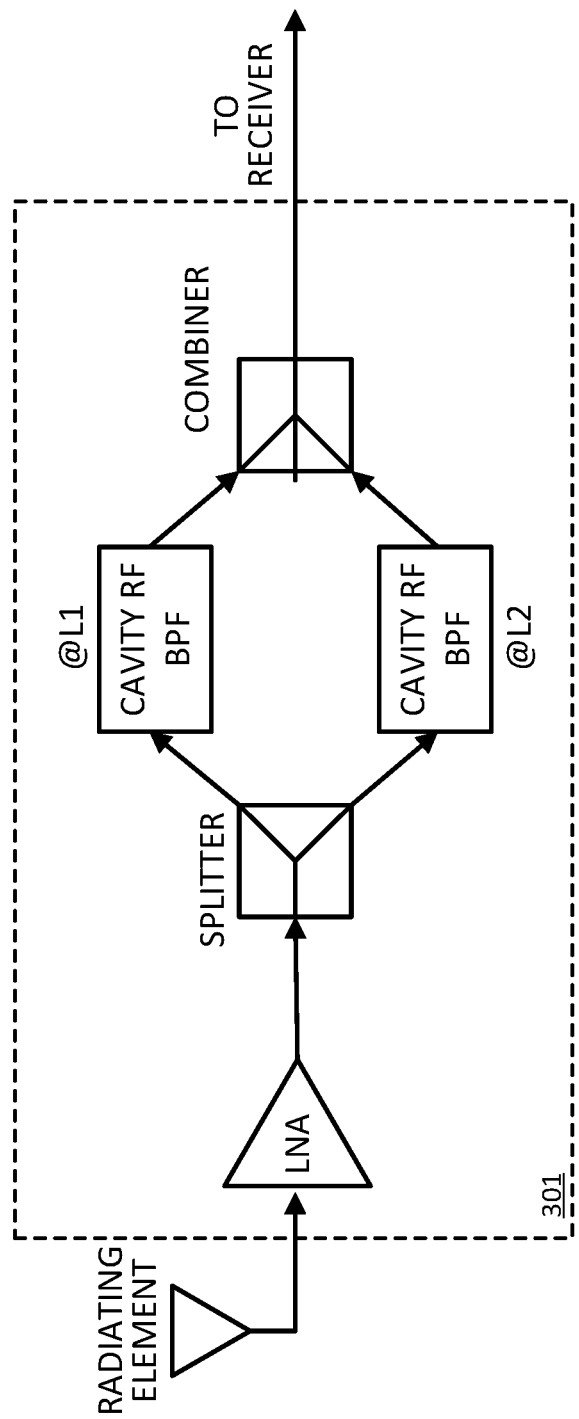
FIGS. 3A-3B illustrate LNA-first and BPF-first configurations with enhanced near-band RFI rejection in accordance with one or more embodiments of the present technology.

There are two basic approaches for placement of the LNAs and BPFs inside a GNSS antenna module. In the first approach, as shown in FIG. 3A, the LNAs and BPFs are arranged such that the signals passing through the radiating element are first amplified by the LNAs and then filtered by the BPFs (here referred to as LNA-first approach); while the second approach (referred to as BPF-first) takes the opposite processing order. In the example of FIG. 3A, a cavity RF BPF is used in both branches.

Since the LNA is immediately subsequent to the radiating element in antenna module 301, the LNA-first configuration cannot further enhance the anti-RFI-saturation capability of the antenna module beyond that provided by the radiating element. Especially when using the wideband helix radiating element with this configuration, the LNA is exposed directly to threat of RFI within the band between 1300 to 1559 MHz. The advantage of this configuration is that it can achieve the best NF performance given a large LNA gain.

Figure 3B:
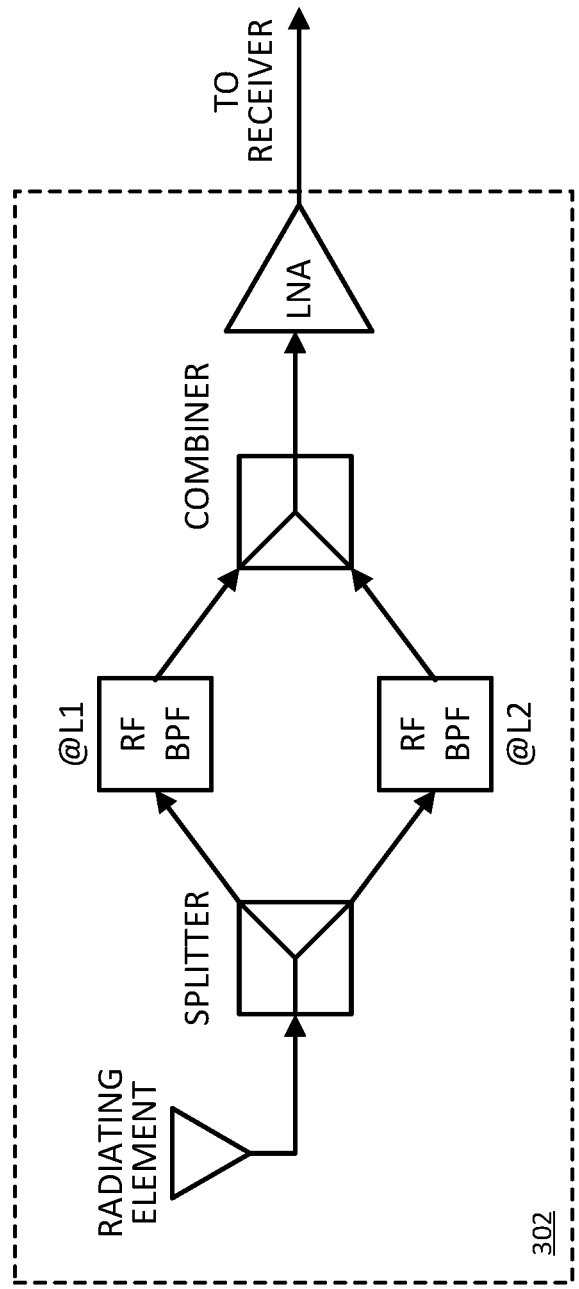

BPF-first architecture 302 is illustrated in FIG. 3B. Due to the superior stopband attenuation of the BPF compared to that of the radiating element, this configuration can significantly enhance the OoB RFI rejection of the LNA-first antenna module. However, this advantage is obtained at the cost of total NF increase compared to the LNA-first configuration in FIG. 3A. Furthermore, the BPF can be a wideband BPF covering range from the L2 lower frequency to L1 higher frequency, or a dual-band BPF. In both cases, the BPF has limited near-band RFI rejection capability.

Another possible BPF-first configuration 302 with enhanced near-band RFI rejection is shown in FIG. 3B, where a common LNA, is placed after combining the filtered signals of L1 and L2 frequency branches. Each frequency branch comprises an RF BPF. As the two separate BPFs can provide superior stopband as well as near-band attenuation, configuration 302 can significantly enhance the near-band RFI rejection of the antenna module.

2. Analysis of Noise Figure and LNA Saturation Power

Two main constraints in the design of a desirable GNSS antenna module capable of dealing with LNA-saturation issue are the requirements of a better NF performance and a high-power RFI rejection capability. To provide a theoretical support for the design trade-off, analysis of NF and minimum RFI power required for LNA saturation in the two basic configurations of antenna modules is presented in this section.

2.1. Noise Figure Analysis

For a series circuit with n stages, the total noise factor F is governed by the Friis' Formula in the following form:

$$F = F_1 + \frac{F_2 - 1}{G_1} + \frac{F_3 - 1}{G_1 G_2} + \ldots + \frac{F_n - 1}{G_1 G_2 \ldots G_{n-1}}. \quad (1)$$

where $F_i$ and $G_i$ (i=1, 2 . . . n) are the noise factor and gain, respectively, of the i-th stage in the RF chain, and n is the number of stages. For passive devices, the noise factor, $F_i$, is equal to the corresponding attenuation ratio (insertion loss), $L_i$. Moreover, the gain and attenuation ratio of a passive device are inverses of each other, i.e., $$L_i = \frac{1}{G_i}. \quad (2)$$

The NF is defined as the noise factor in dB as:

$$\text{NF} = 10 \log_{10}(F) \quad (3).$$

It is apparent from equation (1) that the NFs of the first LNA and components in front of it will dominate the receiver noise performance.

Assuming that the noise factors of the antenna element, LNA, and BPF are $F_a$, $F_{LNA}$ and $F_{BPF}$, respectively, and the LNA gain is $G_{LNA}$, then according to the equations (1) and (2) the total noise factor of the antenna module with the LNA-first architecture, denoted $F_{preL}$, can be expressed as:

$$F_{preL} = F_a + \frac{F_{LNA} - 1}{G_a} + \frac{F_{BPF} - 1}{G_a G_{LNA}} = \quad (4)$$
$$F_a + F_a(F_{LNA} - 1) + \frac{F_a(F_{BPF} - 1)}{G_{LNA}} \cong F_a F_{LNA}.$$

The reason for the rightmost approximation in above equation is that the LNA generally has a gain, $G_{LNA}$, much greater than $F_a(F_{BPF}-1)$, so that $$\frac{F_a(F_{BPF} - 1)}{G_{LNA}} \cong 0. \quad (5)$$

The total noise factor of the antenna module with the BPF-first architecture, denoted $F_{preB}$, can be written as:

$$F_{preB} = F_a + \frac{F_{BPF} - 1}{G_a} + \frac{F_{LNA} - 1}{G_a G_{BPF}} = \quad (6)$$
$$F_a + F_a(F_{BPF} - 1) + F_a F_{BPF}(F_{LNA} - 1) = F_a F_{LNA} F_{BPF}.$$

Since the noise factor of any device is always greater than unity, the following relationship must hold as:

$$F_a F_{LNA} F_{BPF} > F_a F_{LNA} \Leftrightarrow F_{preB} > F_{preL} \quad (7).$$

Equation 7 explains the better noise performance of the antenna module with LNA-first configuration compared to that with the BPF-first configuration. Furthermore, as the NF of the following stages of the GNSS receiver after the antenna module are significantly reduced by the gain, $G_{LNA}$, of the build-in LNA in the antenna module, the total NF of the whole GNSS receiver approximately equals that of the antenna module. This explains the dominance of normal configuration employed by commercially available GNSS antenna modules for most applications where LNA-saturation is not a main consideration.

2.2. LNA Saturation Power Analysis

The impact of RFI on a specific LNA is mainly determined by the RFI power level received by the LNA. When the power level of the RFI entering the LNA exceeds a certain level but is less than its 1-dB compression point (a figure-of-merit of the LNA), the NF of the LNA will be increased accordingly, which in turn reduces the GNSS receiver's sensitivity; from the 1 dB compression point onwards, the RFI causes the LNA to go quickly into its gain compression (saturation), rendering the antenna module inoperable.

The received RFI power, $P_R$, by the LNA inside an antenna module can be approximately related to the RFI transmitting power, $P_T$, using the RF free-space propagation formula as:

$$P_R = P_T + G_T + G_R + G_{BPF} + 20 lg\left(\frac{\lambda}{4\pi d}\right) \quad (8)$$

where $G_T$ is the RFI transmitting antenna gain; $G_R$ is the GNSS receiving radiating element gain; $G_{BPF}$ is the BPF gain if the antenna module adopts the BPF-first configuration, and otherwise $G_{BPF}=0$ dB for the LNA-first configuration; $\lambda$ is the RFI wave length; and d is the distance from the RFI transmitting antenna to the radiating element phase center. Assuming the RFI transmitting antenna is isotropic (without loss of generality in accordance with various embodiments of the architecture), then $G_T=0$ dB, and equation (8) becomes:

$$P_R = P_T + G_R + G_{BPF} + 20 lg\left(\frac{\lambda}{4\pi d}\right). \quad (9)$$

Assuming the input 1 dB compression point of the LNA is $P_{1dB}$, then from equation (9) the minimum RFI transmitting power $P_{T\text{-}1\ dB}$ that can result in LNA saturation can be calculated by:

$$P_{T\text{-}1dB} = P_{1dB} - G_R - G_{BPF} - 20 lg\left(\frac{\lambda}{4\pi d}\right). \quad (10)$$

This equation is obtained by substituting $P_T$ and $P_R$ in equation (9) with $P_{T\text{-}1\ dB}$ and $P_{1dB}$, respectively. At the same distance d, $P_{T\text{-}1\ dB}$ is a measurer of anti-LNA-saturation capability of different antenna module configurations.

Measured at the input of LNA, the minimum RFI to signal (I/S) ratio required for LNA saturation can be used as another indicator of the anti-RFI-saturation capability of antenna module configurations:

$$I/S = P_{1dB} - P_s - G_R - G_{BPF} \quad (11)$$

where $P_s$ is the nominal power of GNSS signals received at the earth's surface under the assumption of isotropic receiving radiating element, and $P_s=-130$ dBm for GPS L1 C/A signals.

To illustrate the anti-RFI-saturation capabilities of the two basic GNSS antenna module configurations, consider a L1/L2 patch passive antenna (GPSF.36.7.A.30) from the Taoglas Company, a MAX2659 LNA, and a TTE-315P L1 BPF as an example for analysis. The necessary parameters for the analysis at three different RFI frequencies, $f_{RFI}$, is listed in Table 1. Among these three selected RFI frequencies, the first one, 1575.42 MHz, is the center frequency, $f_L$, of GPS L1 signals; 1530 MHz represents a near-band RFI frequency with respect to $f_L$, and is within the lower band of LightSquared signals which is regarded as a potential interfering source of GPS L1 signals; and 1300 MHz is used as an OoB RFI frequency, which is within the spectrum allocated for systems that perform missions critical to safe and reliable such as air traffic control (ATC).

TABLE 1

Performance parameters of LNA, radiating element, and BPF at 3 different RFI frequencies

| RFI band | In-band | Near-band | OoB |
|---|---|---|---|
| $f_{RFI}$ (MHz) | 1575.42 | 1530 | 1300 |
| $P_{1dB}$ (dBm) | −14 | −14 | −13 |
| $G_R$ (dB) | 5.3 | 0.8 | −20 |
| $G_{BPF}$ (dB) | −1.8 | −50.8 | <−50.8 |

According to equation (11), the I/S values for the two basic antenna module configurations with different $f_{RFI}$ is shown in Table 2. When the antenna module adopts LNA-first configuration and is subject to in-band RFI, I/S takes its minimum value of 100.7 dB which is greater than that sufficient to prevent an advanced receiver with a nulling antenna from working (95 dB). Therefore, it is inefficient for an intended interferer to cause LNA saturation as its ultimate goal of operation. This partially explains why the LNA saturation issue of GNSS antenna modules has not gained much attention in GNSS community so far.

TABLE 2

I/S values for MAX2659 LNA saturation (in unit of dB)

| $f_{RFI}$ (MHz) | 1575.42 | 1530 | 1300 |
|---|---|---|---|
| LNA-first | 100.7 | 118.2 | >136 |
| BPF-fist | 102.5 | 169 | >186.8 |

Figure 4:
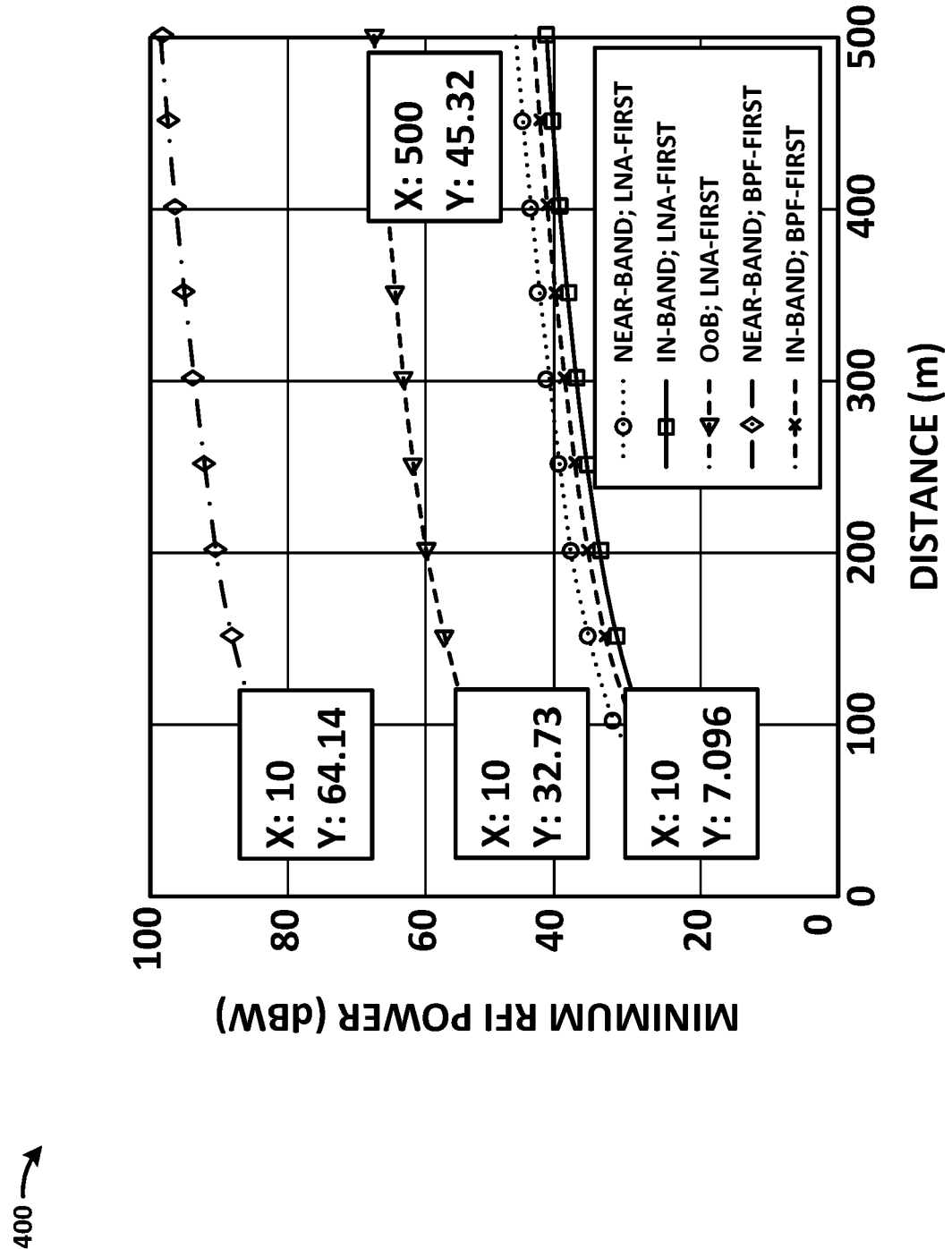
FIG. 4 illustrates a minimum RFI transmitting power required for LNA saturation using patch antenna in accordance with some embodiments of the present technology.

However, some specific applications may require the receiver to operate in the proximity of unintended RFI sources such as LightSquared stations and ATC radar or other large radio equipment. Under such conditions, the LNA saturation issue must be considered in selection or design of the antenna module. To illustrate the problem involved, FIG. 4 shows the minimum RFI power required for MAX2659 LNA saturation as a function of d and with the RFI frequencies as a running parameter for the two basic configurations.

When d=10 m, the required minimum transmitting powers of in-band RFI inducing MAX2659 LNA saturation are only 5.1 W (7.1 dBW) and 7.8 W (8.9 dBW) when the antenna module adopts LNA-first or BPF-first configurations, respectively. This indicates that when in-band RFI operating at a relatively short distance from the GNSS receivers, it can easily block the antenna module by saturating the LNA employed, regardless of the two basic configurations. At the same distance d, employing LNA-first antenna module, the pre-LNA can tolerate only 13.6 W (11.3 dBW) near-band RFI, which is much smaller than the authorized LightSquared transmission power of 42 dBW; the maximum OoB RFI power (31.7 dBW) that the pre-LNA can cope with is also within the transmission power range of most ATC radars. Therefore, operating near the RFI source, the near- and out-of-band signal rejection of the patch antenna radiating elopement alone may not be sufficient to prevent the pre-LNA from being saturated in a LNA-first configuration. By contrast, the BPF-first configuration can significantly improve the anti-RFI-saturation capability of antenna module under near- and out-of-band RFI: more than 50 dB improvement can be gained depending the specific OoB rejection of the pre-BPF. Another observation is that, with the increase of RFI transmitting distance, d, the risk of LNA saturation will be significantly reduced. For example, once d exceeds 500 m, the LNA-first antenna module can get rid of the saturation issue induced by LightSquared.

The above analysis shows that it is only suitable for a GNSS receiver without special interfering signals in the neighborhood or suffering intentional high-power RFI to use a LNA as the first component after the antenna element to obtain a low NF; the BPF-first configuration of antenna module can effectively suppress near- and out-of-band RFI, but it cannot solve the LNA saturation issue caused by in-band RFI.

3. LNA Saturation Issue Under Cross-Frequency RFI Conditions

The BPF-first antenna module configuration such as 101B in FIG. 1 is effective for OoB RFI rejection and thus protection of LNA from saturation by OoB RFI. However, RFI within GNSS bands of interest is more challenging to mitigate than OoB RFI. Even if the in-band RFI is within only one GNSS frequency band, once it causes the common LNA to saturate, the reception of GNSS signals at other frequency bands can also be interrupted. In-band RFI that causes a common LNA saturation is referred to as cross-frequency RFI herein.

Figure 5A:
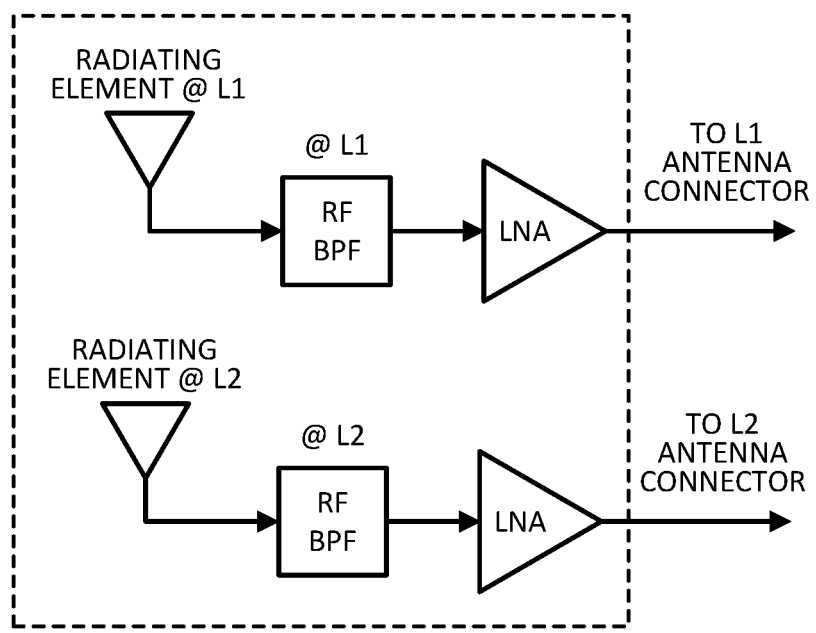
FIGS. 5A-5B illustrate two antenna module designs resistant to one-way cross-frequency RFI for dual-band GNSS receiver in accordance with various embodiments of the present technology.
Figure 5B:
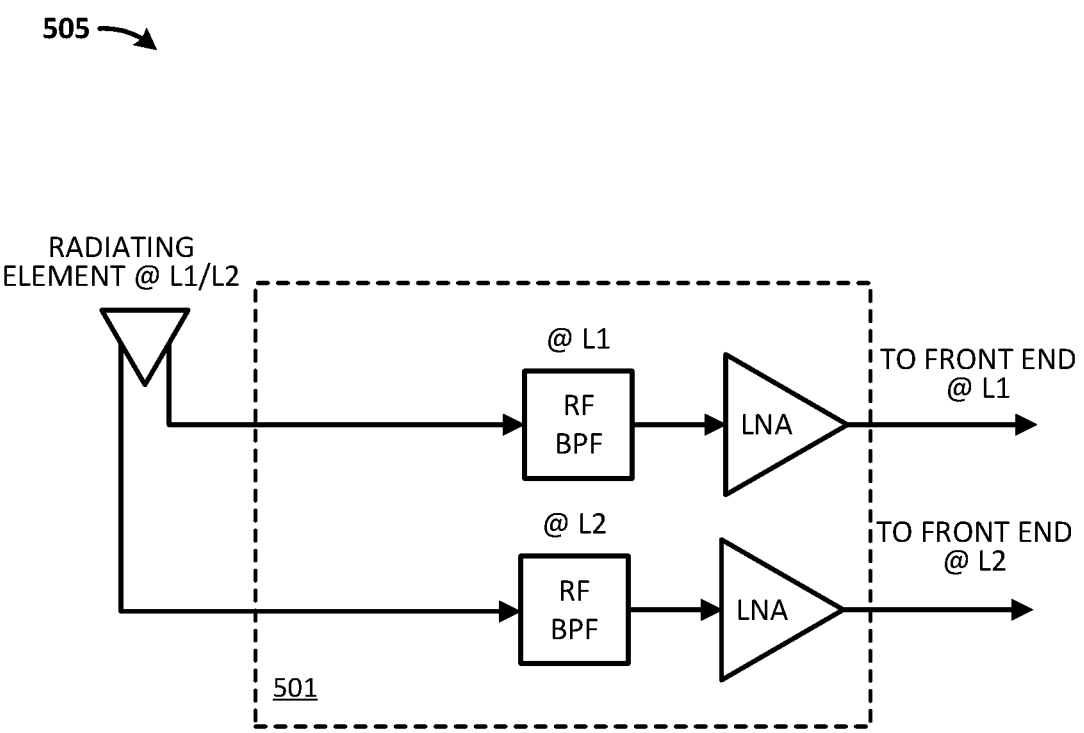

Since the cross-frequency RFI can pass through both the radiating element and the (at least one of) pre-BPFs, neither of the two basic antenna module configurations can sufficiently protect a common LNA from saturation by cross-frequency RFI. In the case of one-way cross-frequency RFI (meaning within only one GNSS frequency band), the second best design of antenna module capable of LNA saturation resistance is how it can be adapted to be able to leverage the other unaffected GNSS frequency bands, thereby ensuring the continuity of GNSS receiver operation. Two possible solutions with this feature are shown in FIGS. 5A and 5B. The first solution, 500 in FIG. 5A, uses separate antenna modules with a BPF-first configuration for each GPS/GNSS frequency. The second solution, 505 in FIG. 5B, employs a two-output antenna element. However, the two solutions presented do not prevent the cross-frequency RFI from entering the receiver. In practice, it is more desirable to block RFI at the antenna stage. Moreover, both solutions are not suitable for most mass market and commercial GNSS receivers that are only compatible with single-input and single-element antennas.

4. Anti-RFI-Saturation Architecture and Working Modes

In the design of a dual-band GNSS antenna module, if no RFI is present, the LNA-first configuration, 301 in FIG. 3A is preferred for better noise performance; under OoB RFI condition, the BPF-first configuration, 302, is required to protect the LNA from being saturated, and the BPF-first configuration, 302, as shown in FIG. 3B can provide enhance near-band RFI rejection; while facing one-way cross-frequency RFI, two separate antenna modules depicted in FIG. 5A is applicable, as it can ensure availability of the GNSS receiver by fully exploiting the frequency diversity of dual-band reception. Any antenna module configurations with fixed connections between involved components cannot combine advantages of these three separate solutions optimal for each specific RFI condition.

Figure 6:
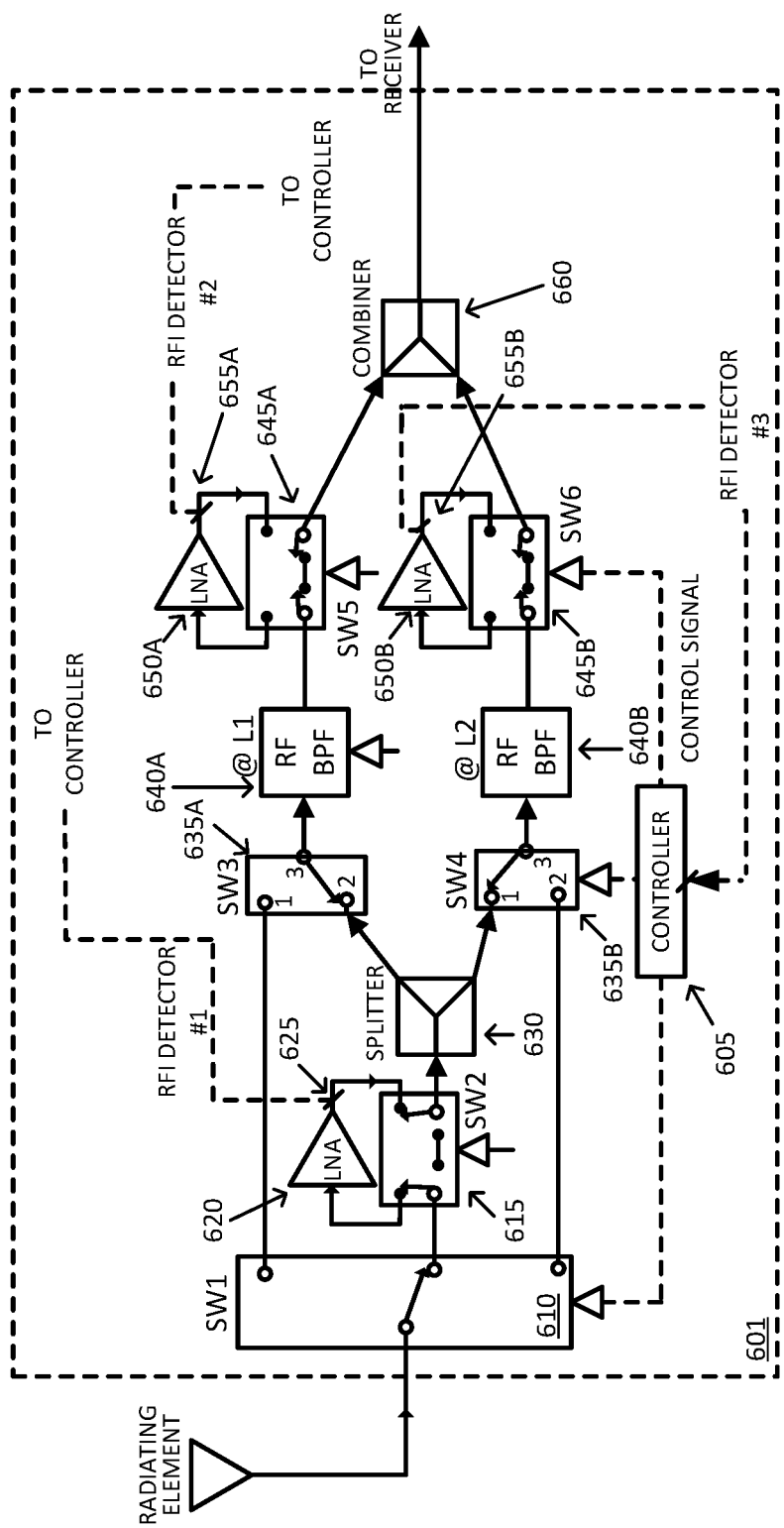
FIG. 6 illustrates an example of an anti-LNA-saturation architecture for dual-band GNSS antenna modules in accordance with one or more embodiments of the present technology.
Figure 7:
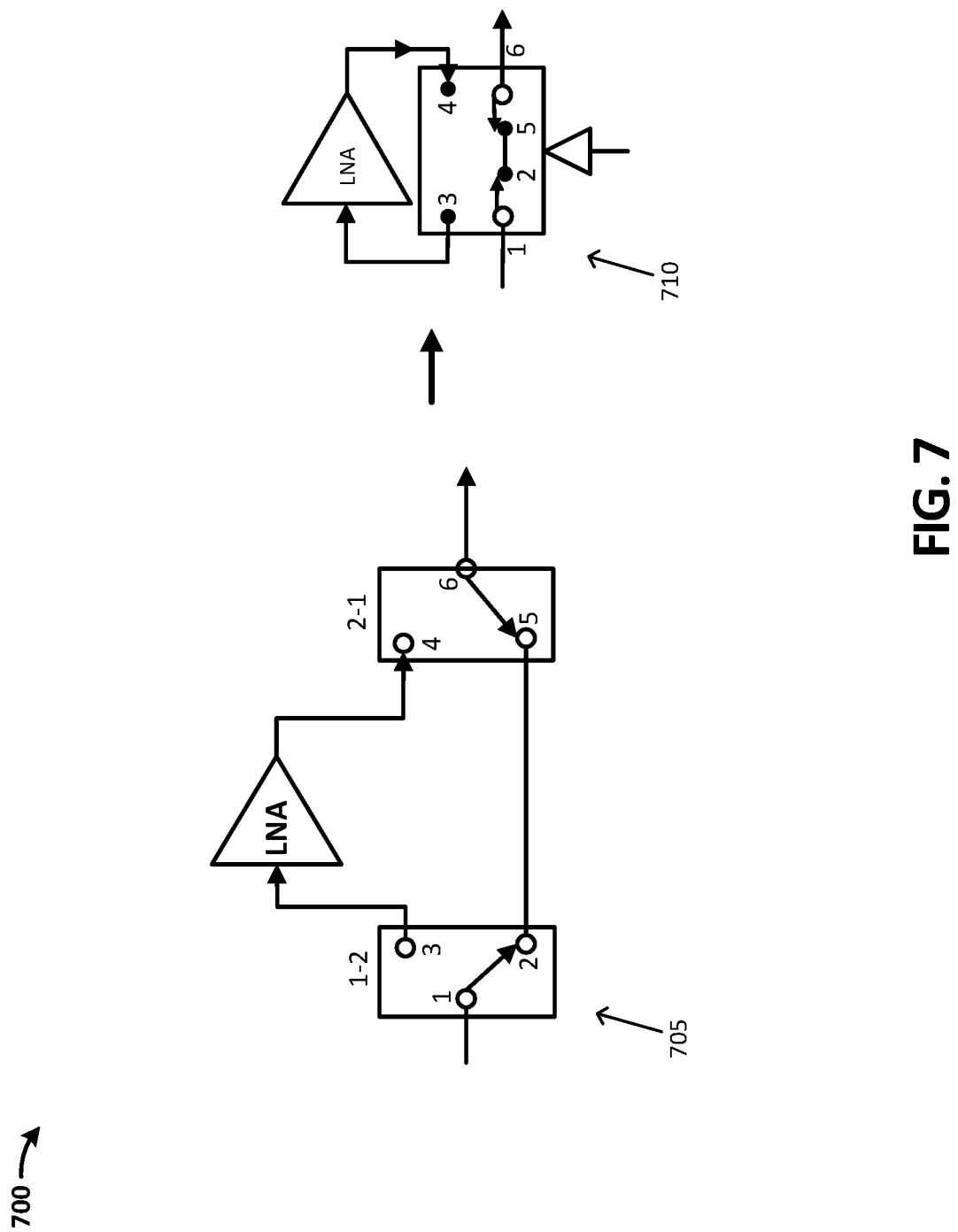
FIG. 7 illustrates a realization of switch 4 and switch 5 in FIG. 6 in accordance with some embodiments of the present technology.

To achieve relatively optimal performance under various RFI conditions in an antenna module with single radiating element and single output cable, a dynamically configurable antenna module architecture may be used in some embodiments as shown in antenna module 601 in FIG. 6 for dual-band GNSS receivers. Additional components including RF switches, power detector and control logic are incorporated to perform on-the-fly configuration of the antenna module according to specific RFI condition detected. Presence of RFI that may induce LNA saturation is indicated by comparing the power detector output with preset thresholds. Control logic module 605 can be used to judge specific RFI condition based on RFI detectors 625, 655A, and 655B and determine the corresponding working mode, which is made possible by a simple search strategy through turning on/off of the RF switches. All the involved components used in some embodiments of the realization of the architecture in FIG. 6 can use commercial off-the-shelf products. Switch 2, 615, switch 5, 645A, and switch 6, 645B, can be realized by connecting one single-pole-double-throw (SPDT) switch 705 and one double-pole-single-throw (DPST) switch 710 as shown in FIG. 7.

Figure 9:
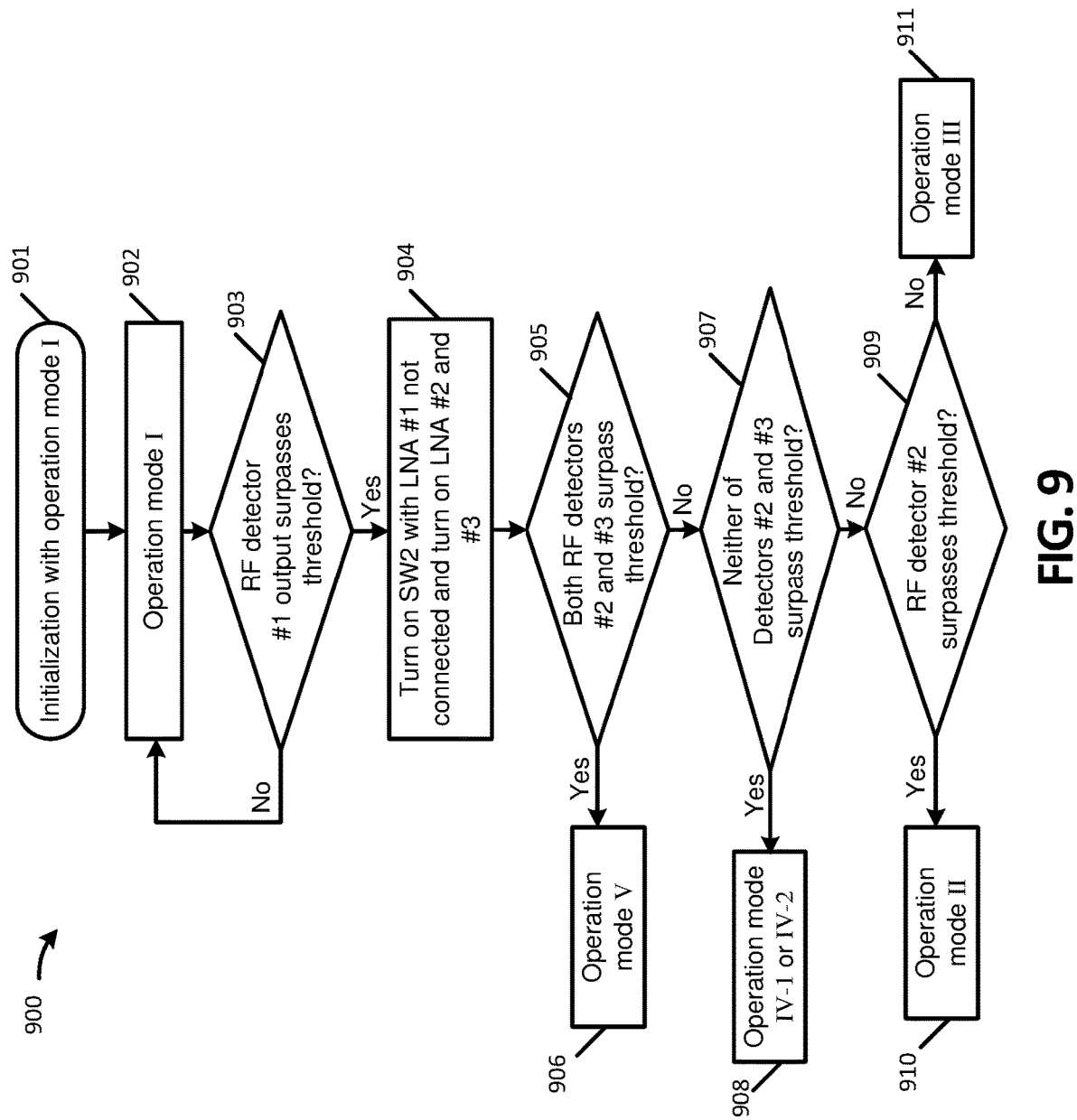
FIG. 9 is a flowchart illustrating an example of a set of operations for selecting the operational mode of a smart antenna module shown in FIG. 6 in accordance with some embodiments of the present technology.

In some embodiments of antenna module 601 illustrated in FIG. 6, antenna module 601 includes switch 1, 610, switch 2, 615, LNA 620, RF detector 625, splitter 630, switches 3 and 4, 635A and 635B, RF BPFs 640A and 640B, switches 5 and 6, 645A and 645B, LNAS 650A and 650B, RF detectors 655A and 655B, combiner 660, and controller 605. Based on thresholds detected by the RF detectors the switches are enabled and disabled to perform the various working modes. The working modes that can be performed by module 601 are demonstrated in Table 3. Some embodiments of the process of determining working modes is further illustrated in FIG. 9.

bands. The switch states and noise performance of each working mode corresponding to the specific RFI condition are summarized in Table 3. The NFs of different solutions are calculated using component performance parameters shown in Table 4. A flow chart illustrating controller logic for various operation mode transitions is illustrated in FIG. 9. The antenna module is initiated with the operation mode I, and the RFI is monitored by checking whether the RFI detector outputs surpass preset threshold. When the RFI is present at the output of RFI detector #1, its type can be then identified by judging the outputs of RFI detectors #2 and #3; and the correct operation mode can be determined.

TABLE 4

Component performance parameters for analysis

| Passive component insertion loss (dB) | | | | |
|---|---|---|---|---|
| Switch | BPF | Splitter | Combiner | LNA |
| 0.3 | 1.8 | 3.23 | 0.25 | NF: 0.8 (dB) Gain: 20.5 (dB) |

In Table 3, it should be noted that none of the antenna module configurations/working modes are capable of dealing with the two-way cross-frequency RFI conditions. Among the other four RFI conditions, both the proposed and separate antenna module solutions have minimal NFs when there is no RFI. The NF of operational mode IV-2 is inflated mainly due to the use of the splitter when the proposed solution is set to BPF-first configuration. Operational mode IV-2 can receive both L1 and L2 frequencies under OoB and near-band RFI, while operational mode IV-1 can provide a better NF by not using the splitter and sacrificing one frequency. For each specific RFI condition, except operational mode IV-1, the separate solutions have better noise performance than the proposed one. However, the separate configurations are optimal only for specific RFI. By contrast, the various embodiments of the present technology can cope with different RFI conditions with noise performance degradation less than 1 dB compared to the corresponding separate solutions.

Figure 8A:
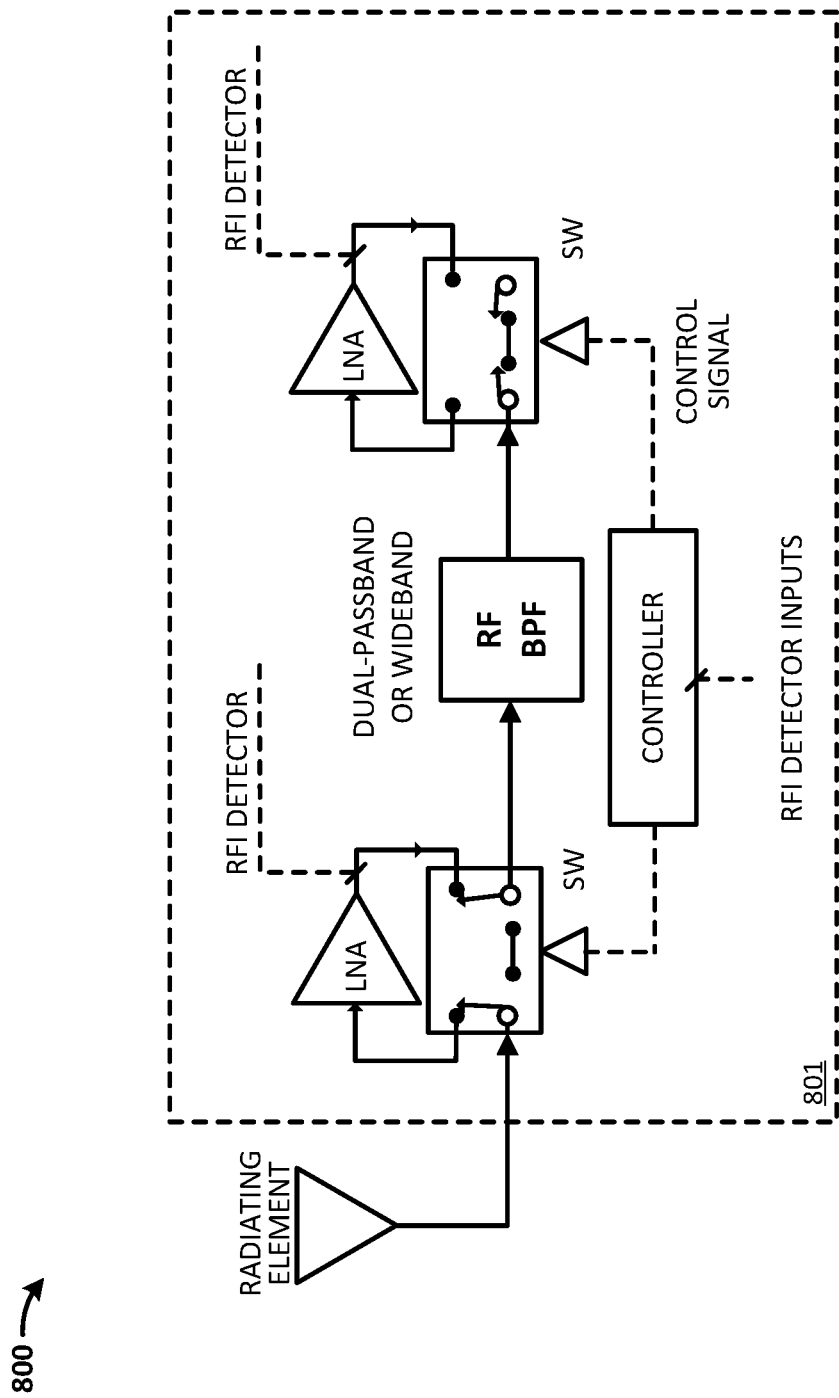
FIGS. 8A-8B are two variations of the various embodiments of the smart antenna architecture that may be used in some embodiments of the present technology.
Figure 8B:
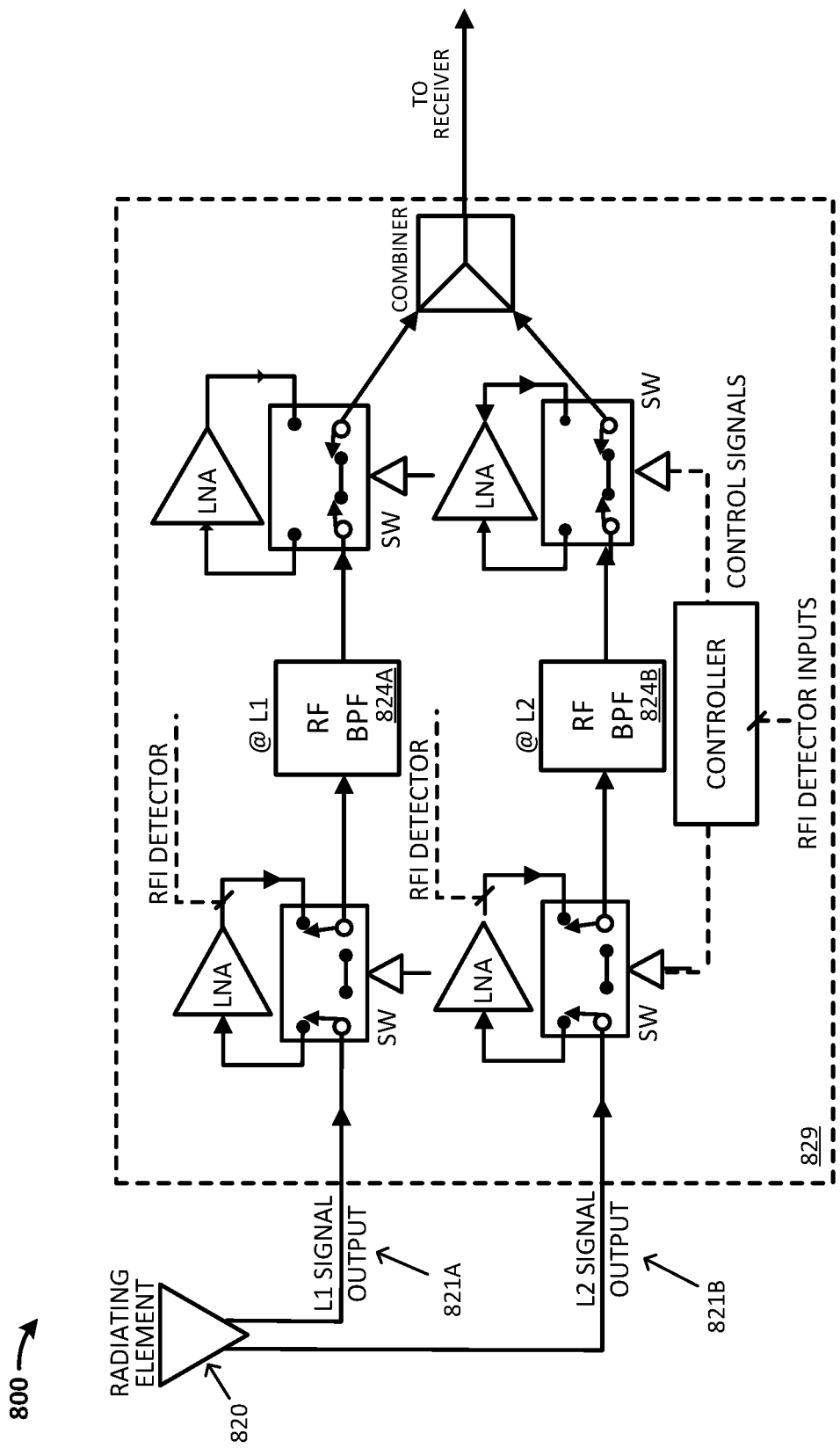

FIGS. 8A-8B are two variations of various embodiments of the smart antenna architecture. Antenna module 801 of

TABLE 3

Switch states and noise performance of each working mode.

| RFI Conditions | Operating Modes | Switch state (connected ports) | | | | | | NF (dB) of different solutions | |
|---|---|---|---|---|---|---|---|---|---|
| | | SW1 | SW2 | SW3 | SW4 | SW5 | SW6 | Proposed | Separate |
| No RFI | I | 1-3 | 1-3; 4-6 | 2-3 | 1-3 | 1-2; 5-6 | 1-2; 5-6 | 1.4 | 0.8 (FIG.3A) |
| Cross RFI @ L1 | II | 1-4 | open | open | 2-3 | open | 1-3; 4-6 | 3.5 | 2.6 (FIG.5A) |
| Cross RFI @ L2 | III | 1-2 | open | 1-3 | open | 1-3; 4-6 | open | 3.5 | 2.6 (FIG.5A) |
| OoB or near-band RFI @ L1 & L2 | IV-1 | Adopt mode II or mode III | | | | | | 3.5 | 6.1 (FIG.3B) |
| | IV-2 | 1-3 | 1-2; 5-6 | 2-3 | 1-3 | 1-3; 4-6 | 1-3; 4-6 | 7.0 | 6.1 (FIG.3B) |
| | V | open | — | — | — | — | — | — | — |

According to the occupied bands of the RFI, there are five possible RFI conditions, namely, I: no RFI; II: one-way cross-frequency RFI at L1 band; Ill: one-way cross-frequency RFI at L2 band; IV: OoB or near-band RFI; and V: Two-way cross-frequency RFI affecting both L1 and L2

FIG. 8A uses a single dual-band BPF or a diplexer for RFI and noise filtering. This architecture has a simpler configuration than antenna module 601 in FIG. 6. However, this implementation form typically has limited near-band RFI rejection capability due to a relatively wider transition band of the dual-band BPF or a diplexer employed. FIG. 8B uses radiating element 820 with two outputs, 821A and 821B, through which signals may travel through antenna module 829. Since two separate L1 and L2 BPFs are used, 824A and 824B, its OoB and near-band RFI rejection capability can be comparable to that of antenna module 601 in FIG. 6, and a lower NF can also be obtained. However, the radiating element is still not commercially common.

Various embodiments of antenna module architecture provide a compact solution for LNA saturation rejection with globally optimal performance. However, the flexibility obtained from various embodiments of the architecture can be traded for a slightly increased size, cost and power consumption.

FIG. 9 illustrates a flow chart illustrating an example of a set of operations 900 for selecting the operational mode of a smart antenna module in accordance with some embodiments of the present technology. In step 901, initialization of operation mode I occurs. In step 902, the system is operating in operation mode I. In step 903, the system determines if the output of RF detector 625 surpasses a threshold, wherein the threshold is based on whether or not the signal is saturated. If no, the system loops back to operation in mode I. If yes, the system turns on switch 2 615 with LNA 620 not connected and turns on LNA 650A and LNA 6506 in step 904. In step 905, the system determines if both RF detectors, 655A and 655B, surpass the threshold. If yes, the system switches to operation mode V, in step 906. If no, the system determines if neither output of RF detectors 655A and 655B surpasses the threshold in step 907. If yes, the system operates in mode IV-1 or IV-2 in step 908. If no, the system determines if RF detector 655A surpasses the threshold in step 909. If yes, the system switches to operation mode II in step 910. If no, the system switches to operation mode III in step 911.

Figure 10:
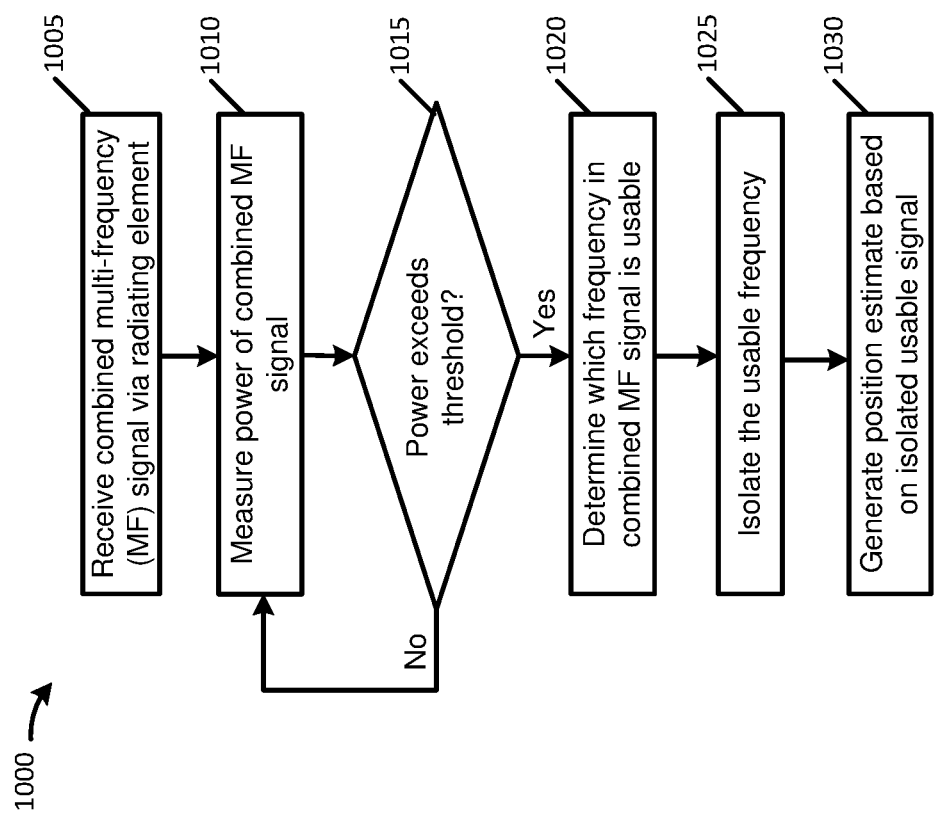
FIG. 10 is a flowchart illustrating an example of a set of operations for generating a position estimate in accordance with some embodiments of the present technology.

FIG. 10 is a flowchart illustrating an example of a set of operation 1000 for generating a position estimate in accordance with some embodiments of the present technology. As illustrated in FIG. 10, receiving operation 1005 a combined multi-frequency signal can be received at a smart antenna module via a radiating element. Monitoring operation 1010 measures the power of the combined multi-frequency signal. In determination operation 1015, a determination can be made as to whether the power crosses a threshold. For example, a controller in the smart antenna module can determines if the power exceeds a threshold value indicative of the signal being saturated. For example, this may occur at RF detector 625 in FIG. 6.

When determination operation 1020 determines that the threshold value has not been crossed, then determination operation 1020 branches to monitoring operation 1010 where the signal is continual monitored for saturation. When determination operation 1015 determines that the signal has crossed a threshold, then determination operation 1015 branches to identification operation 1020 where a determination is made as to which of the multiple frequency signals in the combined multi-frequency signal is useable. Isolation operation 1025 isolates the usable signal. Then, in estimation operation 1030, the usable frequency may be used to generate a position estimate based on the isolated usable signal.

When both signals are saturated that means there is interference/jamming in both frequency bands and it is a no-go situation. Such a situation will likely rarely occur because creating such a system is not trivial; however, sophisticated jammers analogous to hackers might still do that. In accordance with various embodiments, when both signals (or all signals if there are more than two) are jammed the smart antenna module will not pass any signal onto the receiver from the antenna. As a result, the receiver cannot generate any position information. Even in such cases the proposed idea is better since the controller "knows" about the issue and may generate a notification that can be displayed on the receiver. Otherwise without this idea, the receiver will be fed with a distorted signal from the antenna and the receiver might produce wrong output and also doesn't know that there is interference/jamming.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A receiver system comprising:
   an antenna module configured to receive a multi-frequency signal, wherein the antenna module includes:
      a radiating element; and
      control logic to detect power from the multi-frequency signal and select either:
         a first path routing the multi-frequency signal to a pair of filters, or
         a second path routing the multi-frequency signal to a low-noise amplifier followed by a splitter before the pair of filters,
      wherein following each filter of the pair of filters is an additional low-noise amplifier each configured to be activated, or deactivated, based on signals from the control logic; and
   a global navigation satellite receiver connected to the antenna module.

2. The receiver system of claim 1, further comprising: a first switch connected to the radiating element, and a second switch, wherein:
   the second switch routes the multi-frequency signal through each of the additional low-noise amplifiers when the control logic has selected the first path; and
   the second switch routes the multi-frequency signal to skip the additional low-noise amplifiers when the control logic has selected the second path.

3. The receiver system of claim 1, wherein the control logic selects the first path, or the second path, based on an interference condition.

4. The receiver system of claim 1, wherein the splitter splits the multi-frequency signal before each of the multi-frequency signals passes through a respective filter of the pair of filters.

5. The receiver system of claim 4, further comprising a combiner, wherein the combiner combines the signals before the signals are received by the global navigation receiver.

6. The receiver system of claim 1, wherein the control logic, upon detecting saturation of the multi-frequency signal, selects the first path of the first switch directing the signal through the filters before the additional low-noise amplifiers.

7. The receiver system of claim 6, wherein the control logic then deactivates one of the additional low-noise amplifiers to identify which frequency is resulting in the saturation.

8. A method for operating a global satellite navigation receiver with an antenna module, the method comprising:
   receiving, via a radiating element of the antenna module, a multi-frequency signal;
   detecting, using control logic, power from the multi-frequency signal;
   selecting, using the control logic, one of:
      a first path routing the multi-frequency signal to a pair of filters, and
      a second path routing the multi-frequency signal to a low-noise amplifier followed by a splitter before the pair of filters; and
   transmitting, using the control logic, signals to an additional low-noise amplifier following each filter of the pair of filters to alternately activate and deactivate a respective additional low-noise amplifier.

9. The method of claim 8, further comprising measuring, using a power detector, the power of the multi-frequency signal.

10. The method of claim 8, further comprising determining when the multi-frequency signal is saturated.

11. The method of claim 10, wherein determining when the multi-frequency signal is saturated comprises comparing the power detector output with preset thresholds.

12. The method of claim 10, further comprising selecting, using the control logic and upon detecting saturation of the multi-frequency signal, the first path of the first switch directing the signal through the pair of filters before the additional low-noise amplifiers.

13. The method of claim 12, further comprising identifying which frequency is resulting in the saturation by deactivating one of the additional low-noise amplifiers.

14. The method of claim 8, further comprising combining, using a combiner, the multi-frequency signals after being split by the splitter and before the multi-frequency signals are received by the global navigation receiver.

15. The method of claim 8, further comprising switching between working modes of the antenna module based on an interference condition.

16. An antenna module for a global satellite navigation receiver, the antenna module comprising:
   a radiating element configured to receive a multi-frequency signal; and
   control logic to detect power from the multi-frequency signal and select one of:
      a first routing path routing the multi-frequency signal to a pair of filters, and
      a second path routing the multi-frequency signal to a low-noise amplifier followed by a splitter before the pair of filters; and
      wherein following each filter of the pair of filters is an additional low-noise amplifier each configured to be activated, or deactivated, based on signals from the control logic.

17. The antenna module of claim 16, further comprising: a first switch connected to the radiating element, and a second switch, wherein:
   the second switch routes the multi-frequency signal through each of the additional low-noise amplifiers when the control logic has selected the first path; and the second switch routes the multi-frequency signal to skip the additional low-noise amplifiers when the control logic has selected the second path.

18. The antenna module of claim 16, wherein the control logic selects the first path, or the second path, based on an interference condition.

19. The antenna module of claim 16, wherein the control logic, upon detecting saturation of the multi-frequency signal, selects the first path of the first switch directing the signal through the filters before the additional low-noise amplifiers.

20. The antenna module of claim 19, wherein the control logic then deactivates one of the additional low-noise amplifiers to identify which frequency is resulting in the saturation.

* * * * *

UNITED STATES PATENT AND TRADEMARK OFFICE
CERTIFICATE OF CORRECTION

| | |
|---|---|
| PATENT NO. | : 11,262,458 B2 |
| APPLICATION NO. | : 16/375458 |
| DATED | : March 1, 2022 |
| INVENTOR(S) | : Dennis M. Akos et al. |

It is certified that error appears in the above-identified patent and that said Letters Patent is hereby corrected as shown below:

On the Title Page (71), Applicant, after "The Regents of the University of Colorado" add --, a body corporate--

In the Specification

Column 11, Line 49, Table 3, delete "S5W3" and insert --SW3--

Column 13, Line 25, delete "6506" and insert --650B--

Signed and Sealed this
Seventeenth Day of October, 2023

Katherine Kelly Vidal
*Director of the United States Patent and Trademark Office*